(12) United States Patent
Wan et al.

(10) Patent No.: US 12,252,897 B1
(45) Date of Patent: Mar. 18, 2025

(54) PORTABLE WATER PUMP USED IN A POOL

(71) Applicant: Shenzhen Haike Plastic Electronics Co., Ltd., Shenzhen (CN)

(72) Inventors: Gangbin Wan, Zhongjiang County (CN); Jianliang Xiong, Fuzhou (CN)

( * ) Notice: Subject to any disclaimer, the term of this patent is extended or adjusted under 35 U.S.C. 154(b) by 0 days.

(21) Appl. No.: 18/752,136

(22) Filed: Jun. 24, 2024

Related U.S. Application Data (63) Continuation-in-part of application No. 18/619,328, filed on Mar. 28, 2024.

(51) Int. Cl.

| | | |
|---|---|---|
| *E04H 4/12* | (2006.01) | |
| *B01D 29/31* | (2006.01) | |
| *B01D 35/26* | (2006.01) | |
| *C02F 1/00* | (2023.01) | |
| *E04H 4/14* | (2006.01) | |
| *F21V 19/00* | (2006.01) | |
| *C02F 103/42* | (2006.01) | |
| *F21Y 103/10* | (2016.01) | |
| *F21Y 113/00* | (2016.01) | |
| *F21Y 115/10* | (2016.01) | |

(52) U.S. Cl.
CPC ........... *E04H 4/1245* (2013.01); *B01D 29/31* (2013.01); *B01D 35/26* (2013.01); *C02F 1/001* (2013.01); *E04H 4/148* (2013.01); *F21V 19/0015* (2013.01); *C02F 2103/42* (2013.01); *C02F 2201/004* (2013.01); *C02F 2201/008* (2013.01); *F21Y 2103/10* (2016.08); *F21Y 2113/00* (2013.01); *F21Y 2115/10* (2016.08)

(58) Field of Classification Search
CPC ....... E04H 4/1245; E04H 4/148; B01D 29/31; B01D 35/26; C02F 1/001; C02F 2103/42; C02F 2201/004; C02F 2201/008; F21V 19/0015; F21Y 2103/10; F21Y 2113/00; F21Y 2115/10
USPC .......................... 210/416.1, 416.2, 416.3, 85
See application file for complete search history.

(56) References Cited

FOREIGN PATENT DOCUMENTS

| CN | 1842659 A | * 10/2006 | ........... F04D 13/086 |
|---|---|---|---|
| CN | 218417919 U | * 2/2023 | |

(Continued)

OTHER PUBLICATIONS

Machine-generated English translation of CN1842659, generated on Aug. 30, 2024.*

(Continued)

*Primary Examiner* — Fred Prince (57) ABSTRACT

A portable water pump used in pool includes an engine, a filtering mesh, and a lighting assembly. The lighting assembly and the engine are both arranged in the filtering mesh. The lighting assembly is electrically connected to the engine. The lighting assembly includes a support and a light source main body, which further includes a lamp body and a housing. The support is arranged on the filtering mesh. When the engine is turned on, the lighting assembly can emit light. Therefore, even if a user uses the portable water pump used in pool at night, the situation inside a pool and the situation of the portable water pump used in pool can also be observed. The material of the housing is transparent polyvinyl chloride so that the housing is waterproof and able to protect the lamp body. It is convenient to assemble the housing on the support, which also makes the light source main body become more attractive.

16 Claims, 6 Drawing Sheets

(56) References Cited

FOREIGN PATENT DOCUMENTS

CN          220012385 U  *  11/2023
WO     WO-2004020834 A2 *   3/2004   ........... A01K 63/047

OTHER PUBLICATIONS

Machine-generated English translation of CN218417919, generated on Aug. 30, 2024.*
Machine-generated English translation of WO 2004020834, generated on Aug. 30, 2024.*
Machine-generated English translation of CN 220012385, generated on Aug. 30, 2024.*

* cited by examiner

PORTABLE WATER PUMP USED IN A POOL

CROSS-REFERENCE TO RELATED APPLICATIONS

This application is a Continuation-in-Part of the U.S. application Ser. No. 18/619,328 filed on Mar. 28, 2024, and entitled "POND WATER PUMP," now pending, the entire disclosures of which are incorporated herein by reference.

TECHNICAL FIELD

The present disclosure relates to a water pump, and in particular, a portable water pump used in pool, which is applied to the technical field of water pump equipment.

BACKGROUND

A current water pump refers to a pump that has an air (water) suction nozzle for entering and an air (water) discharging nozzle for exiting. Furthermore, a vacuum or negative pressure can be continuously formed at an inlet.

Portable water pumps can help water circulation, prevent deposition of dirt in water, and maintain clear and fresh water. Portable water pumps can be used in swimming pools to mainly circulate and filter pool water. Portable water pumps can filter and purify the pool water through a filter and keep the pool water clear and clean. Portable water pumps can also be used in pools. They continuously suck water from a pool and return the water back into the pool so that nutrients in the water are uniformly flipped, which avoids dead water zones in the water and maintains the ecological balance of the pool. However, the current portable water pumps on the market are inconvenient to use at night and have relatively single functions, making it difficult to observe the underwater pumping states of these water pumps. On the other hand, these water pumps may suck other important objects during pumping so that they need to be provided with external equipment. For example, an additional lamp needs to be used for monitoring the underwater pumping situation.

SUMMARY

For the above-mentioned issues that the current portable water pumps used in pool are inconvenient to be used at night and have relatively single functions, making it difficult to observe underwater pumping states of these water pumps, the present disclosure provides a portable water pump used in pool with a lighting assembly. The lighting assembly is arranged in a filtering mesh; the lighting assembly is electrically connected to the engine; and when the engine is turned on, the lighting assembly can emit light. Therefore, even if a user uses the portable water pump used in pool at night, the situation inside the pool and the situation of the portable water pump used in pool can also be observed.

The technical solution adopted by the present disclosure to solve these issues is as follows.

A portable water pump used in pool includes an engine, a filtering mesh, and a lighting assembly; the lighting assembly and the engine are both arranged in the filtering mesh; and the lighting assembly is electrically connected to the engine.

Further, a top of the filtering mesh is provided with a placement groove; the engine is mounted in the placement groove; and the lighting assembly is located at a bottom of the placement groove.

Further, the lighting assembly includes a support and a light source main body; the support is arranged on the filtering mesh; and the light source main body is mounted on the support.

Further, the support is an annular support; a mounting groove is arranged on an outer side wall of the support; the support sleeves an outer side wall of the placement groove; and the light source main body is arranged in the mounting groove.

Further, there is more than one clamping block arranged on an inner side wall of the support; insertion ports are arranged at a periphery of a side wall of the placement groove; and when the support is mounted on the filtering mesh, the clamping blocks are clamped in the insertion ports.

Further, the support includes an upper mounting part and a lower mounting part; the upper mounting part and the lower mounting part can be spliced and connected; and when the upper mounting part and the lower mounting part are spliced, the mounting groove is formed.

Further, the clamping blocks include a first clamping block and a second clamping block; the first clamping block is arranged on an inner side surface of the upper mounting part, and the second clamping block is arranged on an inner side surface of the lower mounting part; the first clamping block is provided with an insertion pin, and the second clamping block is provided with a jack; and when the upper mounting part and the lower mounting part are mounted, the insertion pin is inserted into the jack.

Further, the light source main body includes a lamp body and a housing; the lamp body is arranged in the housing; light of the lamp body is transmitted through the housing; and the housing seals the lamp body.

Further, a material of the housing is transparent polyvinyl chloride.

Further, the lamp body includes a flexible circuit board and a light-emitting diode (LED) lamp; and the LED lamp is arranged on the flexible circuit board and is electrically connected to the flexible circuit board.

Further, the portable water pump used in pool further includes an electric wire; a first threading hole is arranged on the filtering mesh; a second threading hole is arranged on the support; a third threading hole is arranged on the housing; one end of the electric wire is connected to the engine, and the other end of the electric wire is connected to the lamp body through the first threading hole, the second threading hole, and the third threading hole in sequence; the third threading hole is connected to the electric wire through interference fit; and the electric wire is connected to the first threading hole through interference fit.

Further, the filtering mesh includes a filtering mesh main body and a wire passing cover; the filtering mesh main body is provided with a mounting port; the wire passing cover is detachably arranged at the mounting port; and the first threading hole is arranged on the wire passing cover.

Further, first water baffle plates are arranged between the filtering mesh and a side wall of the placement groove; and the first water baffle plates are located on two sides of the first threading hole.

Further, second water baffle plates are further arranged between the filtering mesh and the side wall of the placement groove; and the second water baffle plates are located on a side opposite to the first water baffle plates.

Further, a ring groove is arranged on an outer side wall of the engine; the ring groove is arranged around the outer side wall of the engine; a convex block is arranged at a periphery of an inner side wall of the placement groove; the convex block is clamped into the ring groove, so that the engine is connected to the filtering mesh.

Further, a bottom of the placement groove is provided with several first through holes, and a side wall of the placement groove is provided with several second through holes.

Further, an outer side wall of the filtering mesh is provided with several third through holes, and the third through holes extend from a top edge of the filtering mesh to a bottom edge of the filtering mesh.

The present disclosure has the beneficial effects: providing a portable water pump that can be used in pool at night. The lighting assembly is arranged in a filtering mesh; the lighting assembly is electrically connected to the engine; and when the engine is turned on, the lighting assembly can emit light. Therefore, even if a user uses the portable water pump used in pool at night, the situation inside the pool and the situation of the portable water pump used in pool can also be observed. The material of the housing is transparent polyvinyl chloride so that the housing is waterproof and able to protect the lamp body. It is convenient to assemble the housing on the support, which also makes the light source main body become more attractive.

DETAILED DESCRIPTION OF THE EMBODIMENTS

In order to make the aims, technical solution, and advantages of the present disclosure clear, the present disclosure is further described below in combination with accompanying drawings and implementations. It should be understood that the specific embodiments described herein are intended only to explain the present disclosure and are not intended to define the present disclosure.

Figure 1:
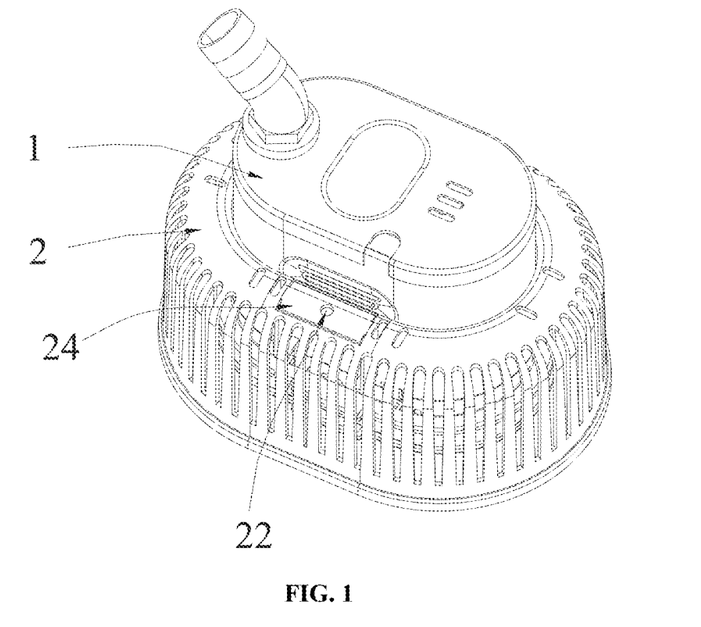
FIG. 1 is a three-dimensional diagram of a portable water pump used in pool according to the present disclosure.
Figure 2:
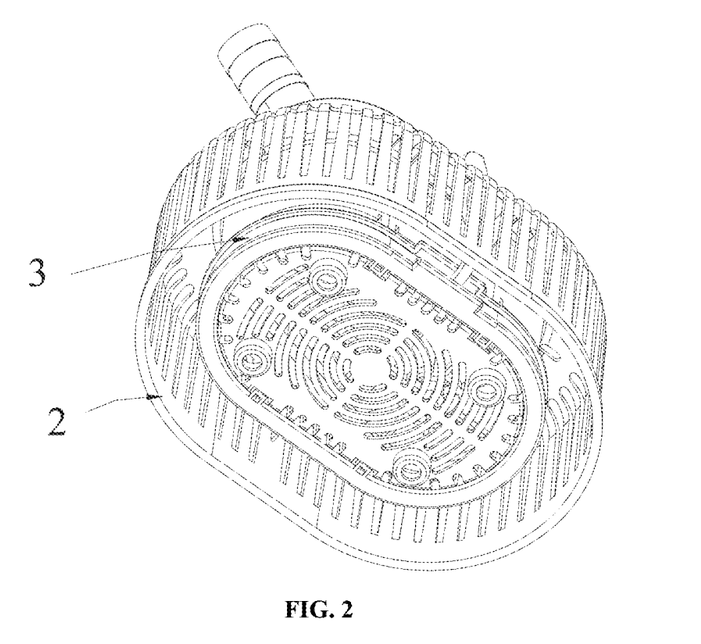
FIG. 2 is a three-dimensional diagram thereof through another viewing angle of FIG. 1 according to the present disclosure.

Referring to FIG. 1 to FIG. 8, the present disclosure provides a portable water pump used in pool. It is inconvenient for a user to use existing portable water pumps in pool at night, and a water pumping state cannot be observed, so that it is in urgent need for a portable water pump used in pool to solve the above problems. As shown in FIG. 1 to FIG. 2, the portable water pump in this embodiment includes an engine 1, a filtering mesh 2, and a lighting assembly 3; the lighting assembly 3 and the engine 1 are both arranged in the filtering mesh 2; and the lighting assembly 3 is electrically connected to the engine 1. By the arrangement of the lighting assembly, a user can observe a water pumping state at night when using the water pump. That is, when the engine is turned on, the lighting assembly can emit light. Therefore, even if the user uses the portable water pump used in pool at night, a situation inside a pool and a situation of the portable water pump used in pool can also be observed. The filtering mesh can be made of a plastic material or another metal material. However, the filtering mesh in this embodiment is made of the plastic material, which reduces the overall weight of the portable water pump used in pool and also reduces the manufacturing cost of the portable water pump used in pool.

The light emitted by the lighting assembly in this embodiment can be monochromatic light, such as pure white light, or can be dazzling light mixed with various colors. The light emitted by the lighting assembly in this embodiment is preferably white light. The white light can more clearly distinguish the situation in pool and the situation around the filtering mesh.

Figure 7:
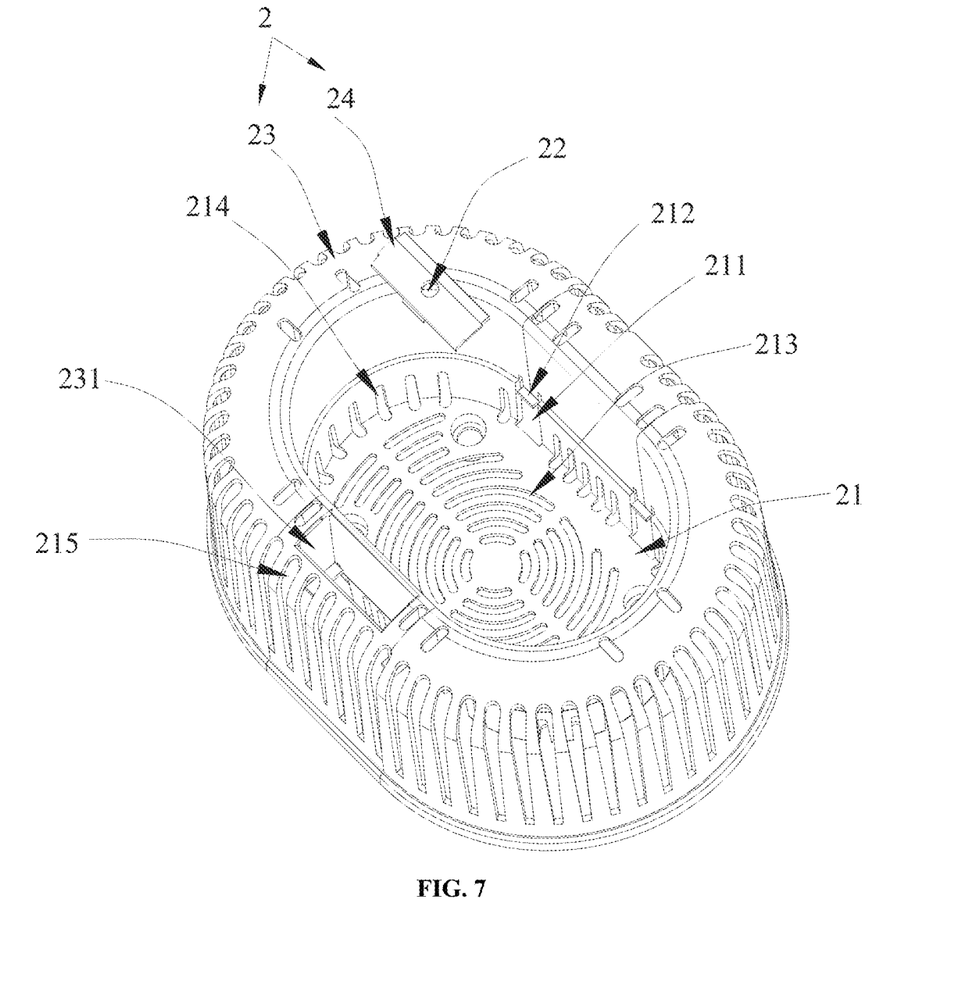
FIG. 7 is a three-dimensional diagram of a filtering mesh according to the present disclosure.

In this embodiment, as shown in FIG. 1 and FIG. 7, a top of the filtering mesh 2 is provided with a placement groove 21; the engine 1 is mounted in the placement groove 21; and the lighting assembly 3 is located at a bottom of the placement groove 21. This structure facilitates the mounting of the engine. The lighting assembly is arranged at the bottom of the engine, so that the light of the lighting assembly can irradiate the bottom of the pool and the filtering mesh, making it convenient for the user to observe the situation inside the pool or around the filtering mesh. In this embodiment, the lighting assembly is arranged on an outer side wall of the placement groove, so that the light is less blocked. If the lighting assembly is arranged in the placement groove, the light will be more blocked and is relatively weak. If the lighting assembly is arranged on an outer side wall of the filtering mesh, it is difficult to plan wiring of an electric wire, and the wire may be damaged in a water pumping process of the portable water pump used in pool. In this embodiment, the arrangement position of the lighting assembly will not be limited, but it is preferred that the lighting assembly is arranged on the outer side wall of the placement groove.

Figure 3:
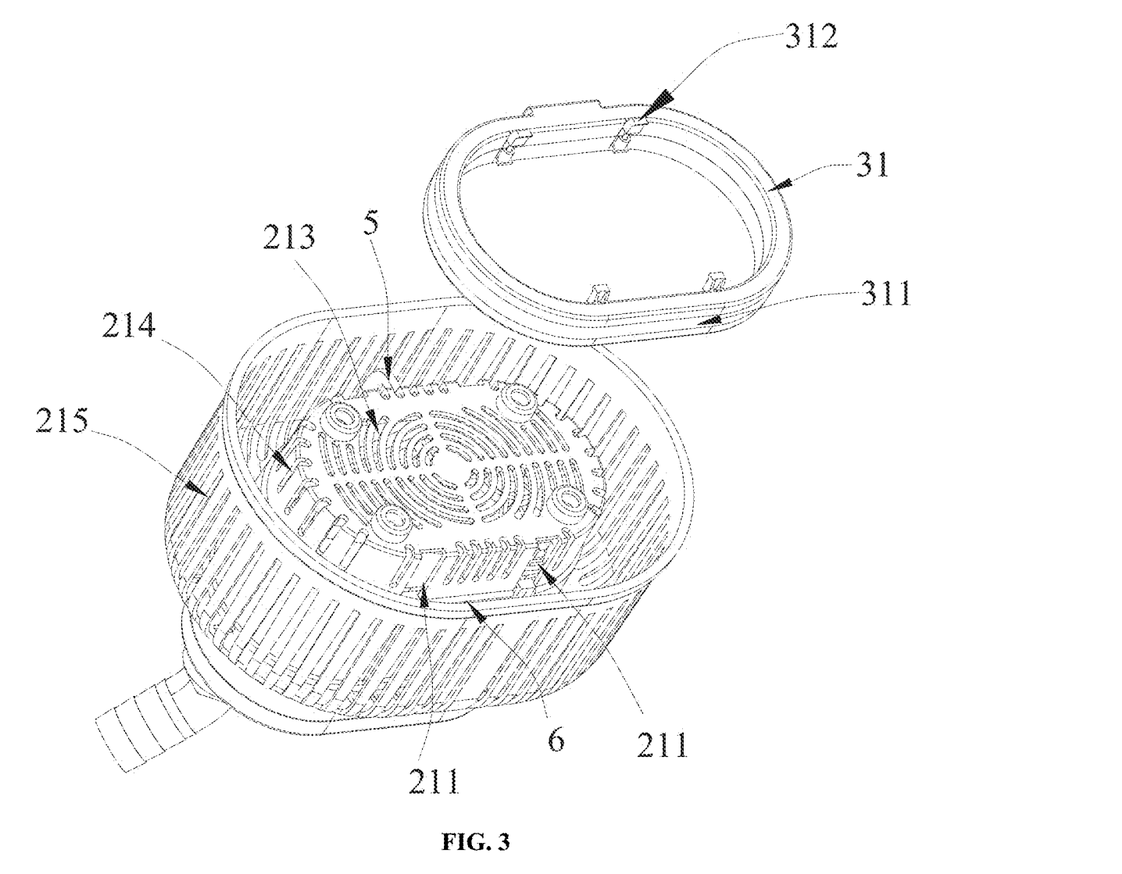
FIG. 3 is an exploded diagram thereof according to the present disclosure.

In this embodiment, as shown in FIG. 3, the lighting assembly 3 includes a support 31 and a light source main body 32; the support 31 is arranged on the filtering mesh 2; and the light source main body 32 is mounted on the support 31. The use of the support is more convenient for the mounting of the light source main body.

Figure 4:
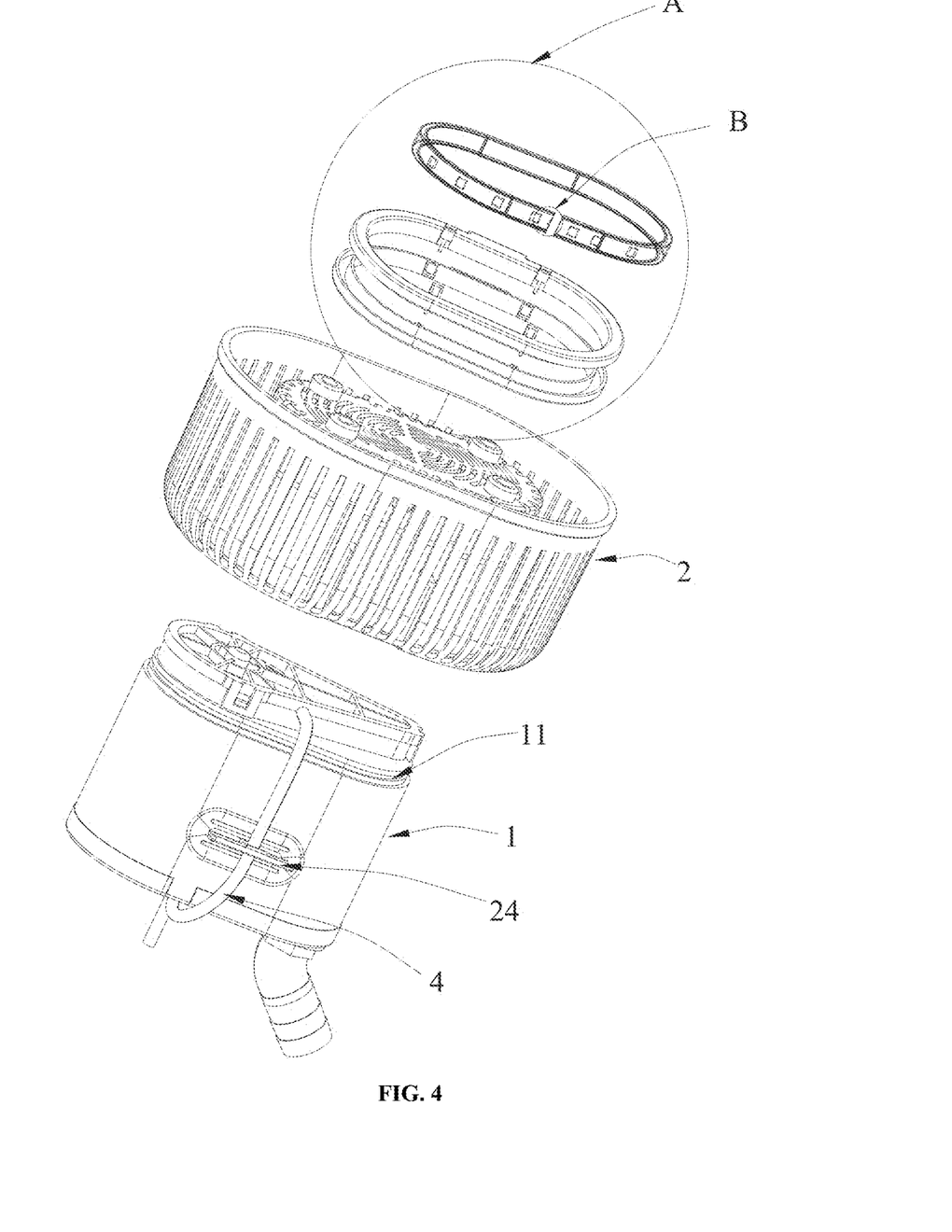
FIG. 4 is a further exploded diagram of FIG. 3 according to the present disclosure.
Figure 5:
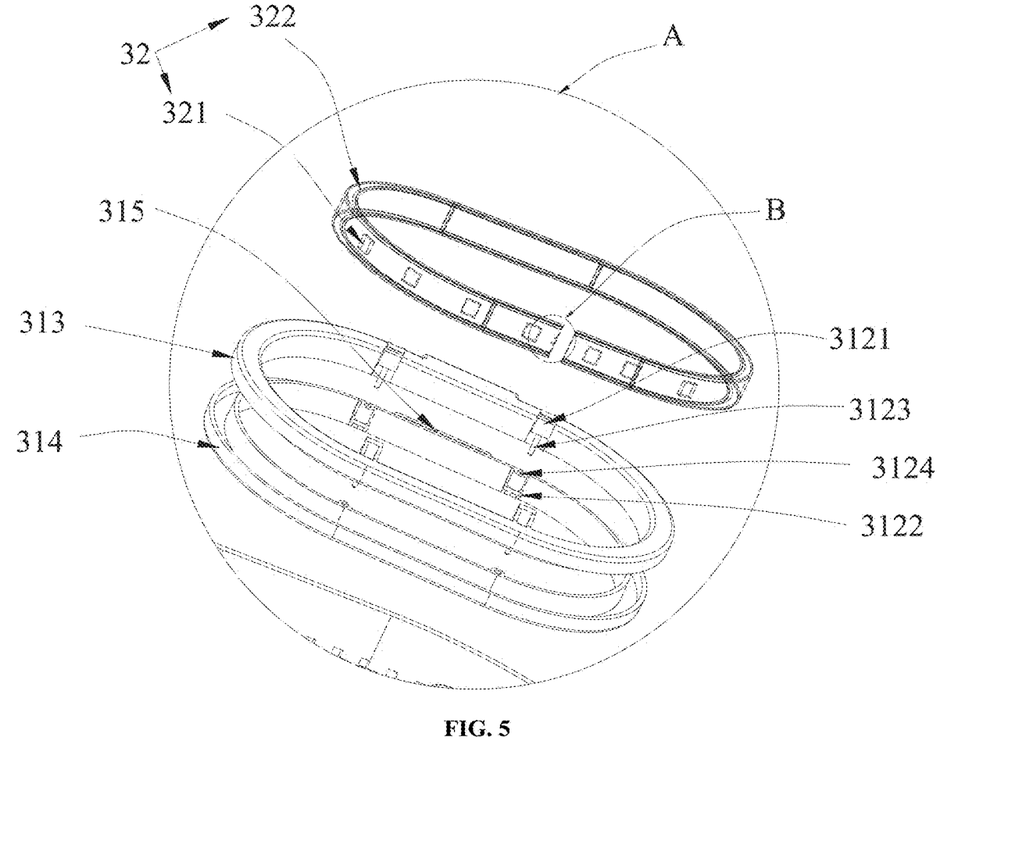
FIG. 5 is an enlarged view of part A in FIG. 4 according to the present disclosure.
Figure 6:
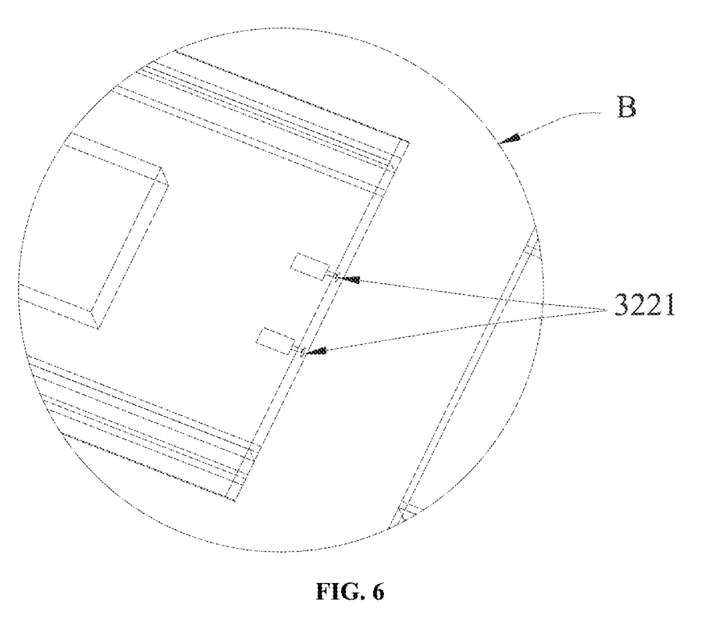
FIG. 6 is an enlarged view of part B in FIG. 4 according to the present disclosure.

In this embodiment, as shown in FIG. 3 to FIG. 5, the support 31 is an annular support; a mounting groove 311 is arranged on an outer side wall of the support 31; the support 31 sleeves an outer side wall of the placement groove 21; and the light source main body 32 is arranged in the mounting groove 311. The mounting groove here is arranged around the outer side wall of the annular support. The light source main body can be arranged along the mounting groove. A plurality of light-emitting main bodies or one light source main body can be provided. As the assembling cost of the plurality of light-emitting main bodies is high, and the assembling time is long, one light source main body is preferred in this embodiment, and a flexible circuit board and an outer shell made of a flexible transparent material is used. The outer shell made of the flexible transparent material includes the flexible circuit board. The flexible circuit board is provided with a plurality of parallel light-emitting diode (LED) lamps, that is, light of the light source main body can be dispersed around the filtering mesh, and it is convenient for the user to observe the situation around the filtering mesh and also convenient for the user to observe the situation at the bottom of the pool. Therefore, the user does not need to use external light source equipment to observe the pool or the portable water pump used in pool. This brings convenience for the user.

In this embodiment, as shown in FIG. 3 to FIG. 5, there is more than one clamping block 312 arranged on an inner side wall of the support 31; insertion ports 211 are arranged at a periphery of a side wall of the placement groove 21; and when the support 31 is mounted on the filtering mesh 2, the clamping blocks 312 are clamped in the insertion ports 211. This structure facilitates cooperation and connection between the support and the filtering mesh. The clamping manner is more convenient and simpler than bolting. The clamping manner saves the cost and shortens the assembling time.

In this embodiment, as shown in FIG. 5, the support 31 includes an upper mounting part 313 and a lower mounting part 314; the upper mounting part 313 and the lower mounting part 314 can be spliced and connected; and when the upper mounting part 313 and the lower mounting part 314 are spliced, the mounting groove 311 is formed. By the arrangement of the upper mounting part 313 and the lower mounting part 314, it is convenient to mount and assemble the support. If the upper mounting part and the lower mounting part are not separately arranged, it is hard to assemble the support to the filtering mesh.

In this embodiment, the clamping blocks 312 include a first clamping block 3121 and a second clamping block 3122; the first clamping block 3121 is arranged on an inner side surface of the upper mounting part 313, and the second clamping block 3122 is arranged on an inner side surface of the lower mounting part 314; the first clamping block 3121 is provided with an insertion pin 3123, and the second clamping block 3122 is provided with a jack 3124; and when the upper mounting part 313 and the lower mounting part 314 are mounted, the insertion pin 3123 is inserted into the jack 3124. It should be noted that during the mounting of the upper mounting part and the lower mounting part, the upper mounting part is first mounted, and the lower mounting part is then mounted. In this way, the insertion pin can be inserted into the jack, which facilitates the assembling of the support. In addition, this mounting structure makes the connection between the upper mounting part and the lower mounting part more stable and prevents damage to the support due to an impact force of water.

In this way, as shown in FIG. 5, the light source main body 32 includes a lamp body 321 and a light-transmittance housing 322; the lamp body 321 is arranged in the housing 322; and the housing 322 seals the lamp body 321 to achieve a waterproof effect and protect the lamp body. In this embodiment, the light-transmittance housing preferably uses a white transparent material, so that the light transmittance performance is better, and the situation in pool and the situation around the filtering mesh can be observed more clearly.

Figure 8:
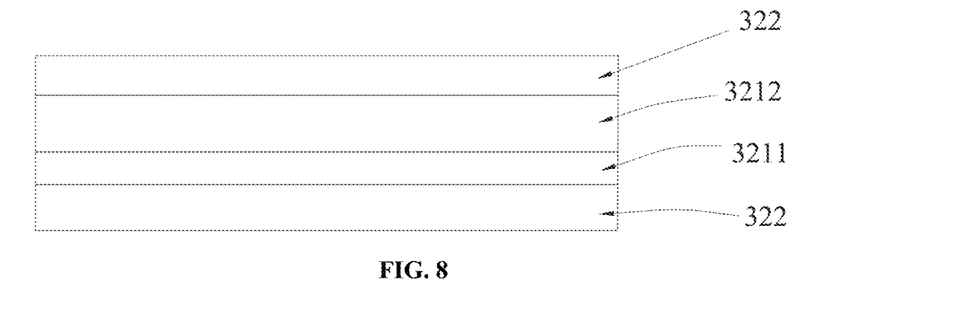
FIG. 8 is a cross-sectional view of a lamp body according to the present disclosure.

In this embodiment, as shown in FIG. 5 and FIG. 8, the lamp body 321 includes a flexible circuit board 3211 and an LED lamp 3212; and the LED lamp 3212 is arranged on the flexible circuit board 3211 and is electrically connected to the flexible circuit board 3211. A material of the housing 322 is transparent polyvinyl chloride (PVC). The transparent PVC in this embodiment is soft and transparent, which is convenient for arranging the light source main body around the mounting groove and assembling the light source main body. The light source main body in this embodiment cannot be ringlike, but in a straight bar shape. The transparent PVC in this embodiment is soft and transparent, which can be arranged around the mounting groove, so that the assembling time is saved. The PVC has low cost and high plasticity, so that the cost is reduced, and the stability of usage of the product is guaranteed.

In this embodiment, as shown in FIG. 4, the portable water pump used in pool further includes an electric wire 4; a first threading hole 22 is arranged on the filtering mesh 2; a second threading hole 315 is arranged on the support 31; a third threading hole 3221 is arranged on the housing 322; one end of the electric wire 4 is connected to the engine 1, and the other end of the electric wire 4 is connected to the lamp body 321 through the first threading hole 22, the second threading hole 315, and the third threading hole 3221 in sequence; and the third threading hole 3221 and the first threading hole are both connected to the electric wire 4 through interference fit. This structure better protects the connection between the electric wire and the lamp body, so as to prevent damage to the electric wire due to an impact force of a water flow during the running of the portable water pump used in pool.

In this embodiment, as shown in FIG. 7, the filtering mesh 2 includes a filtering mesh main body 23 and a wire passing cover 24; the filtering mesh main body 23 is provided with a mounting port 231; the wire passing cover 24 is detachably arranged at the mounting port 231; and the first threading hole 22 is arranged on the wire passing cover 24. By the arrangement of the wire passing cover, it is more convenient for the mounting of the electric wire. Since the filtering mesh in this embodiment is made of the plastic material, if the first threading hole is directly arranged on the filtering mesh, the filtering mesh will be damaged by a high force in the threading process of the electric wire. By the separate arrangement of the wire passing cover, the wire passing cover is small in volume and hard to damage.

In this embodiment, as shown in FIG. 3, first water baffle plates 5 are arranged between the filtering mesh 2 and a side wall of the placement groove 21; and the first water baffle plates 5 are located on two sides of the first threading hole 22, so as to prevent the damage to the electric wire due to the impact force of the water. When the first threading hole is arranged on the wire passing cover, the first water baffle plates are arranged on the two sides of the mounting port to reduce the impact force of the water flow passing through the wire passing cover and to protect the wire passing cover.

In this embodiment, as shown in FIG. 3, second water baffle plates 6 are further arranged between the filtering mesh 2 and the side wall of the placement groove 21; and the second water baffle plates 6 are located on a side opposite to the first water baffle plates 5 to divide the water.

In this embodiment, a ring groove 11 is arranged on an outer side wall of the engine 1; the ring groove 11 is arranged around the outer side wall of the engine 1; a convex block 212 is arranged at a periphery of an inner side wall of the placement groove 21; the convex block 212 is clamped into the ring groove 11, so that the engine 1 is connected to the filtering mesh 2. This structure is more stable in clamping and more convenient for connection.

In this embodiment, as shown in FIG. 3 and FIG. 7, a bottom of the placement groove 21 is provided with several first through holes 213, and a side wall of the placement groove 21 is provided with several second through holes 214. In this embodiment, the several first through holes are uniformly distributed at the bottom of the placement groove, and the several second through holes are uniformly distributed on the side wall of the placement groove.

In this embodiment, as shown in FIG. 3 and FIG. 7, an outer side wall of the filtering mesh 2 is provided with several third through holes 215, and the third through holes 215 extend from a top edge of the filtering mesh 2 to a bottom edge of the filtering mesh 2.

In summary, the portable water pump used in pool in this embodiment solves the problem of inconvenience in use at night. Furthermore, the portable water pump used in pool in this embodiment is simple in structure, convenient to assemble, and high in stability.

It should be understood that the application of the present disclosure is not limited to the embodiments mentioned above. Those of ordinary skill in the art can obtain improvements or modifications based on the above descriptions. All such improvements and modifications should fall within the scope of protection of the claims of the present disclosure.

What is claimed is:

1. A portable water pump used in a pool comprising:
   an engine, configured to pump water;
   a filtering mesh, wherein a water pumping end of the engine is arranged in the filtering mesh; the filtering mesh is connected to the engine; the filtering mesh is configured to filter slag; and
   a lighting assembly, wherein the lighting assembly is arranged in the filtering mesh; and the lighting assembly is electrically connected to the engine,
   wherein a top of the filtering mesh is provided with a placement groove; the engine is mounted in the placement groove; and the lighting assembly is located on an outer side surface of a bottom of the placement groove.

2. The portable water pump used in a pool according to claim 1, wherein the lighting assembly comprises a support and a light source main body; the support is arranged on the filtering mesh; and the light source main body is mounted on the support.

3. The portable water pump used in a pool according to claim 2, wherein the support is an annular support; a mounting groove is arranged on an outer side wall of the support; the support sleeves an outer side wall of the placement groove; and the light source main body is arranged in the mounting groove.

4. The portable water pump used in a pool according to claim 3, wherein there is more than one clamping block arranged on an inner side wall of the support; insertion ports are arranged at a periphery of a side wall of the placement groove; and when the support is mounted on the filtering mesh, the clamping blocks are clamped in the insertion ports.

5. The portable water pump used in a pool according to claim 4, wherein the support comprises an upper mounting part and a lower mounting part; the upper mounting part and the lower mounting part can be spliced and connected; and when the upper mounting part and the lower mounting part are spliced, the mounting groove is formed.

6. The portable water pump used in a pool according to claim 5, wherein the clamping blocks comprise a first clamping block and a second clamping block; the first clamping block is arranged on an inner side surface of the upper mounting part, and the second clamping block is arranged on an inner side surface of the lower mounting part; the first clamping block is provided with an insertion pin, and the second clamping block is provided with a jack; and when the upper mounting part and the lower mounting part are mounted, the insertion pin is inserted into the jack.

7. The portable water pump used in a pool according to claim 2, wherein the light source main body comprises a lamp body and a housing; the lamp body is arranged in the housing; light of the lamp body is transmitted through the housing; and the housing seals the lamp body.

8. The portable water pump used in a pool according to claim 7, wherein a material of the housing is transparent polyvinyl chloride.

9. The portable water pump used in a pool according to claim 7, wherein the lamp body comprises a flexible circuit board and a light-emitting diode (LED) lamp; and the LED lamp is arranged on the flexible circuit board and is electrically connected to the flexible circuit board.

10. The portable water pump used in a pool according to claim 7, wherein the portable water pump used in the pool further comprises an electric wire; a first threading hole is arranged on the filtering mesh; a second threading hole is arranged on the support; a third threading hole is arranged on the housing; one end of the electric wire is connected to the engine, and the other end of the electric wire is connected to the lamp body through the first threading hole, the second threading hole, and the third threading hole in sequence; the third threading hole is connected to the electric wire through interference fit; and the electric wire is connected to the first threading hole through interference fit.

11. The portable water pump used in a pool according to claim 10, wherein the filtering mesh comprises a filtering mesh main body and a wire passing cover; the filtering mesh main body is provided with a mounting port; the wire passing cover is detachably arranged at the mounting port; and the first threading hole is arranged on the wire passing cover.

12. The portable water pump used in a pool according to claim 10, wherein first water baffle plates are arranged between the filtering mesh and a side wall of the placement groove; and the first water baffle plates are located on two sides of the first threading hole.

13. The portable water pump used in a pool according to claim 12, wherein second water baffle plates are further arranged between the filtering mesh and the side wall of the placement groove; and the second water baffle plates are located on a side opposite to the first water baffle plates.

14. The portable water pump used in a pool according to claim 1, wherein a ring groove is arranged on an outer side wall of the engine; the ring groove is arranged around the outer side wall of the engine; a convex block is arranged at a periphery of an inner side wall of the placement groove; the convex block is clamped into the ring groove, so that the engine is connected to the filtering mesh.

15. The portable water pump used in a pool according to claim 1, wherein a bottom of the placement groove is provided with several first through holes, and a side wall of the placement groove is provided with several second through holes.

16. The portable water pump used in a pool according to claim 1, wherein an outer side wall of the filtering mesh is provided with several third through holes, and the third through holes extend from a top edge of the filtering mesh to a bottom edge of the filtering mesh.

* * * * *